Sept. 8, 1925.
A. R. BURNETTE
METHOD OF SOFTENING WATER
Filed April 17, 1922
1,553,067
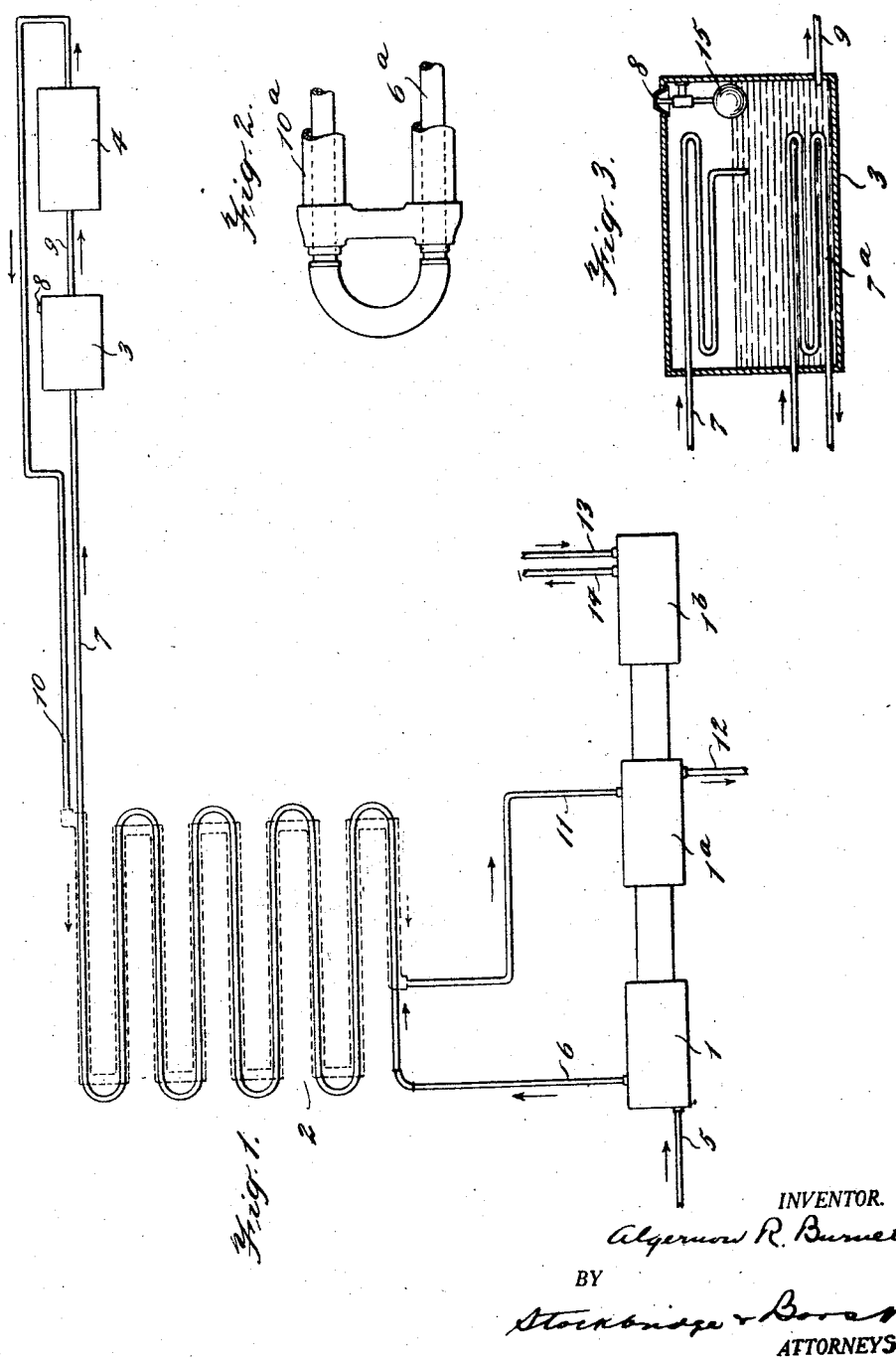
INVENTOR.
Algernon R. Burnette
BY
Stockbridge & Borst
ATTORNEYS.

Patented Sept. 8, 1925.

1,553,067

UNITED STATES PATENT OFFICE.

ALGERNON R. BURNETTE, OF NEW YORK, N. Y., ASSIGNOR TO A. R. BURNETTE CORPORATION, A CORPORATION OF NEW JERSEY.

METHOD OF SOFTENING WATER.

Application filed April 17, 1922. Serial No. 554,072.

*To all whom it may concern:*

Be it known that I, ALGERNON R. BURNETTE, a citizen of the United States, residing at New York, in the county of New York and State of New York, have invented certain new and useful Improvements in Methods of Softening Water, of which the following is a full, clear, and exact description.

My invention relates to the art of rendering hard water soft by removing the salts and suspended matter therein. Treatment of the water for this purpose is desirable in many industries, and it is commonly done, for instance, in preparing the water for the making of artificial ice, for laundry purposes, for use in boiler feed, in the silk industry, and also for drinking and domestic purposes in town water supplies.

While certain salts and suspended matter are removed with comparative ease by filtration and by boiling to precipitate such salts as are soluble in cold water but are changed into an insoluble element or salt by heat, there are other salts, such as the chlorides, which give a so-called permanent hardness to the water inasmuch as they are not precipitated even when the water is boiled.

An object of my invention is to provide a method which will be effective in removing substantially all salts and suspended matter from water and which will be simple and economical to practice.

In accordance with my invention, I subject the raw water to considerable pressure and simultaneously apply heat, preferably raising it substantially to a boiling temperature at such pressure, and then filter the water at this pressure and temperature. I have found that under these conditions of temperature and pressure, even the so-called permanent salts are largely filtered out. For instance, the chlorides are thus reduced, hydrogen chloride being liberated while the insoluble mineral element is precipitated.

My method also contemplates as a matter of economy, the transference of heat from the treated water to the incoming cold water, preferably after the cold water has been placed under pressure. It is also convenient in accordance with my method, to utilize the potential energy in the treated water due to its high pressure, to assist in raising the pressure of the incoming cold water. In this way the treated water emerges from the system at substantially normal pressure and temperature.

I shall now describe my method with the aid of the apparatus illustrated in the accompanying drawings which is one type of system adapted to carry out my method, it being understood that my invention is in no wise limited to this precise apparatus, but that the apparatus and the continuity of the steps of the method may be modified within the limits of the appended claims.

In the drawings—

Fig. 1 is a diagrammatic representation of a system adapted to perform my method.

Fig. 2 is a detail of an end portion of one section of the heat interchanger.

Fig. 3 is a diagrammatic sectional representation of the heater.

The main elements of the apparatus are a pressure-pump 1, a heat interchanger 2, a heater 3 and a filter 4. The raw water at, say, 40 lbs. pressure and 70° F. enters the pump 1 through inlet 5 and is delivered to the heat interchanger through the delivery pipe 6, under pressure which, by way of example, may be said to be 200 lbs. At the initiation of the operation when there is no water returning through the heat interchanger 2, the water emerges from the heat interchanger at 70° F. and passes through the pipe 7 into the heater 3 which is a closed tank. Here heat from any suitable source, such as steam coils 7ª, is applied to the water, preferably until it is raised to the boiling point or thereabouts, and since it is under 200 lbs. pressure, it may be raised to approximately 350° F. The gases which are excluded from the water in this heater escape through a suitable automatically controlled vent 8, and the water at this high temperature and pressure then passes from the heater 3 through pipe 9 to the filter 4 which is of any suitable type, such as a carbon filter. Some soluble salts have been reduced and precipitated in the previous treatment of the water, while others have been rendered insoluble by the temperature and pressure and apparently still have had their chemical characteristics changed so as to be insoluble, and these with other solids are removed in the passage of the water through filter 4. From the filter 4, the soft water passes by way of the pipe 10 to the heat interchanger 2. As illustrated in Fig.

2, this heat interchanger may be in the form of one pipe surrounding the other, and the cold water in the pipe 6 may pass through the inner pipe 6ª and the return hot water may pass through the surrounding pipe 10ª. In the passage of the hot water through the heat interchanger 2, it will give up a large portion of its heat to the incoming cold water with the result that when the incoming water emerges from the heat interchanger and reaches the pipe 7, it is already heated to substantially 350° F. Consequently, when the operation has proceeded far enough to complete one cycle, the water is heated almost to the boiling point before it reaches the heater 3.

The pressure of the return water after leaving the filter 4 has been somewhat reduced and is then substantially 190 lbs. While this pressure may be released by passing the water through an expansion valve, I prefer to utilize it in operating the pump 1. In the form of pump construction shown, there are two operating piston and valve mechanisms 1ª and 1ᵇ, and the treated water from the heat interchanger 2 passes by pipe 11 to the operating piston chamber 1ª and its energy is there utilized in operating the pump 1. When the water emerges from the chamber 1ª through pipe 12, it has been reduced to substantially normal pressure and temperature, and may then be collected for use.

Cooperating with the water-pressure operating elements in the chamber 1ª is a steam piston and valve construction in the chamber 1ᵇ, for operating which live steam enters the intake 13 and is exhausted through pipe 14. If desired, the exhaust steam from this pump may be utilized in the heater 3.

The automatic control of the vent 8 may be effected in any one of various well known ways. For instance, as shown in Fig. 3, the control may be by a float valve 15 which closes the vent when the water in the heater 3 is at normal level. Above the level of the water is a condensing coil which may be simply a continuation of the pipe 7. The condensable vapors are recondensed by contact with this coil, while the gases accumulate in the closed chamber and exert increasing pressure on the water until the level of the water is lowered and the gases are vented, which action is repeated periodically.

I claim:

1. The method of softening water consisting in first delivering the water to a conduit at substantially high pressure, collecting the water from the conduit and heating it substantially to a boiling temperature at such pressure, then filtering the water at such temperature and pressure, and then bringing it into heat-transfer relation to incoming cold water in said conduit.

2. The method of softening water consisting in first delivering the water to a conduit at substantially high pressure, collecting the water from the conduit and heating it substantially to a boiling temperature at such pressure, then filtering the water at such temperature and pressure, then bringing it into heat-transfer relation to incoming cold water in said conduit, and utilizing the pressure of the treated water to develop pressure in the incoming water.

In witness whereof, I hereunto subscribe my signature.

ALGERNON R. BURNETTE.